Patented Apr. 20, 1937

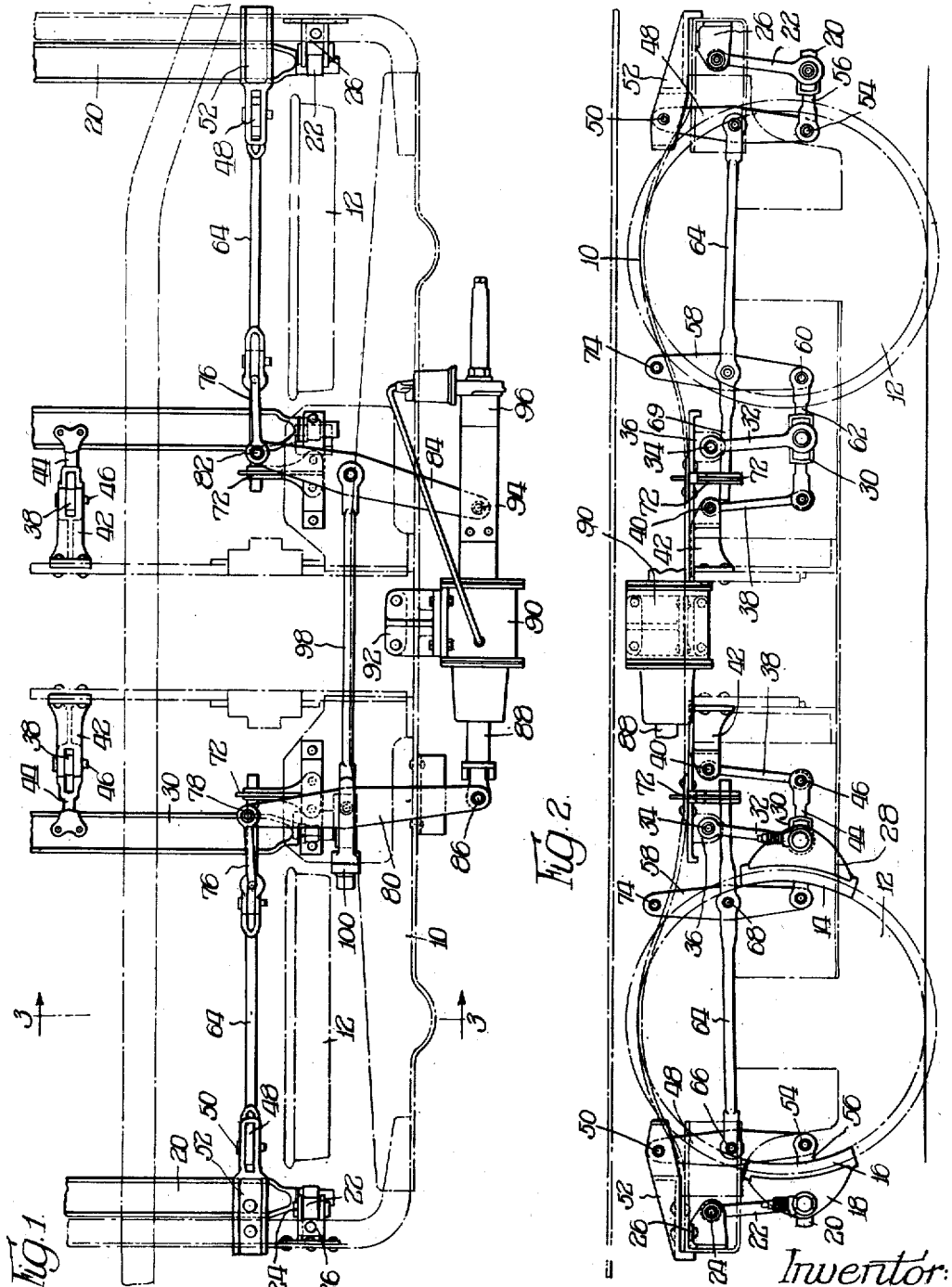

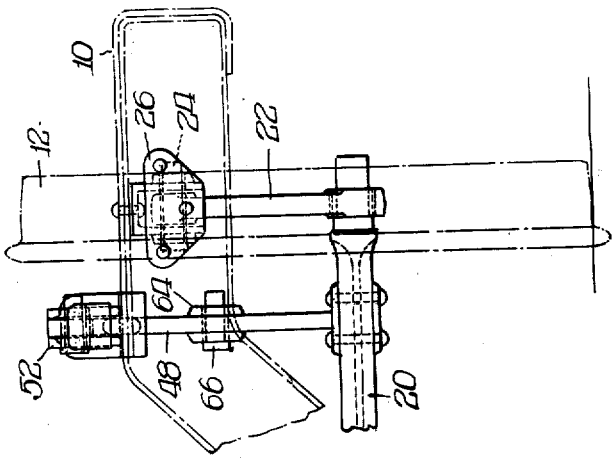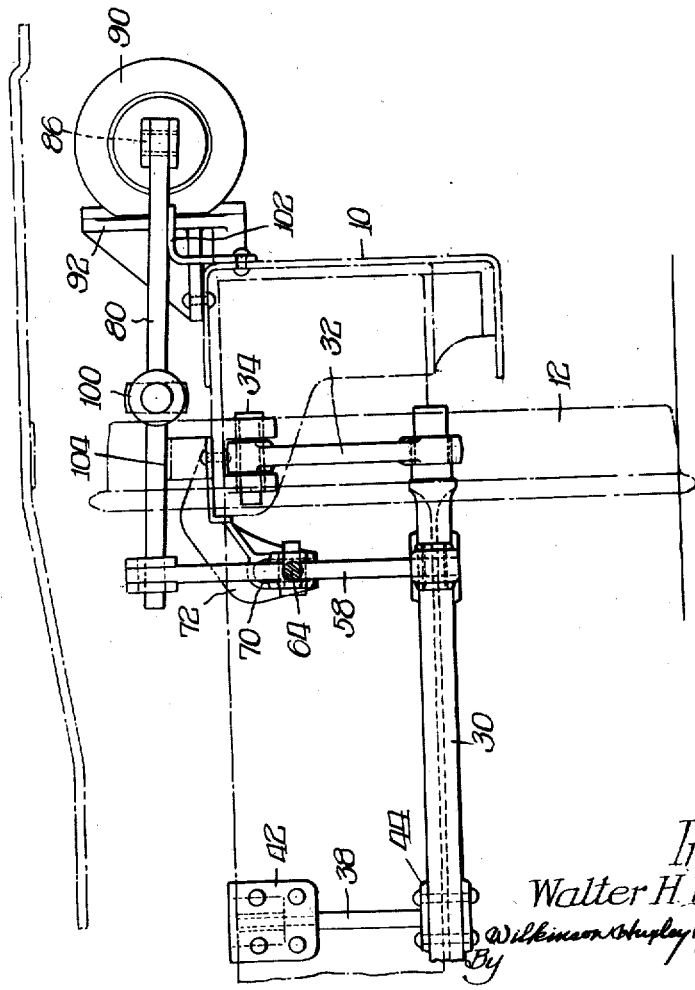

2,077,662

UNITED STATES PATENT OFFICE 2,077,662

CLASP BRAKE

Walter H. Baselt, Chicago, Ill., assignor to American Steel Foundries, Chicago, Ill., a corporation of New Jersey Application June 8, 1933, Serial No. 674,811
Renewed July 29, 1936

33 Claims. (Cl. 188—56)

This invention relates to improvements in brake rigging for railway car trucks of the beam type having associated therewith that type of brake known as the clasp brake, in which brake shoes are applied to opposite sides of each car wheel.

It is an object of this invention to provide a brake mechanism of the so-called beam type, in which the brake cylinder or other actuating means is mounted on or carried by the truck frame.

It is a further object of the present invention to provide such a brake mechanism with a novel arrangement of an automatic slack adjuster which will compensate for the wear of the brake shoes.

A still further object of the present invention is to equip such a system of brakes with a manual slack adjuster to compensate for wheel wear.

It is another object of the present invention to extend the pull rod connecting each pair of live and dead truck levers through a bracket fixed to the truck frame, thereby preventing lateral displacement of the live truck lever.

Still another object of the present invention is to provide an improved arrangement of balance hangers for the inside brake beams.

With these and various other objects in view, the invention may consist in certain novel features of construction and operation as will be more fully described and particularly pointed out in the specification, drawings and claims appended hereto.

In the drawings—

Figure 1 is a fragmentary plan view of a railway car truck embodying the features of the present invention;

Figure 2 is a side elevation of the arrangement shown in Figure 1;

Figure 3 is a fragmentary sectional view taken in the plane as indicated by line 3—3 of Figure 1; and Figure 4 is a fragmentary end elevation.

This application is a continuation-in-part of application Serial No. 602,705, filed April 2, 1932.

Brake rigging of the present invention is shown as applied to a four-wheel truck comprising a truck frame 10 and wheels 12. The wheels are engaged on either side by inner brake shoes 14 and outer brake shoes 16. Brake heads 18 are supported by a brake beam 20 which in turn is carried by brake hangers 22 pivoted at 24 upon brackets 26 fixed to end transoms of the frame 10. The inner brake shoes 14 are supported by brake heads 28 carried by the ends of an inside brake beam 30 which in turn is carried by brake hangers 32 pivotally connected at 34 to brackets 36 fixed to the frame 10. Additional central balance hangers 38 are provided for the inside brake beams pivotally connected at 40 to brackets 42 fixed to the truck frame 10. The brake beams 30 are provided with fulcrums 44 for pivotal connection at 46 to the lower end of each of the hangers 38. These inside balance hangers are disposed in the positions shown to reduce the length of the balance hanger brackets 42.

The dead truck levers 48 are fulcrumed at their upper ends 50 by a pivotal support upon brackets 52 fixed to the ends of the frame 10. The levers 48 are connected at their lower ends 54 by fulcrums 56 to the outside brake beams 20. Live truck levers 58 are connected at their lower ends 60 by fulcrums 62 to the inside brake beams 30. The truck levers associated with each wheel are connected by pull rods 64 pivotally connected at 66 to the dead truck levers intermediate the ends thereof, and pivotally connected at 68 to the live truck levers also intermediate the ends thereof. Each pull rod 64 is extended as at 69 beyond the live truck lever and has sliding cooperation with a slotted opening 70 formed in a guide bracket 72 fixed to the frame 10, the guide so formed being substantially of inverted U-shape. It will be understood that by guiding the pull rod in this manner lateral displacement of the live truck levers is prevented.

The upper ends 74 of the live truck levers 58 are pivotally connected by links 76 to the inner end 78 of a live cylinder lever 80 and the inner end 82 of a dead cylinder lever 84, respectively. The outer end 86 of the live cylinder lever is connected to the piston rod 88 of the cylinder unit 90 which is carried by the bracket 92 upon the frame 10. The dead cylinder lever 84 is connected at its outer end 94 to an automatic slack adjuster device 96. The cylinder levers 80 and 84 are pivotally connected intermediate their ends by pull rod 98 provided with a manual slack adjuster 100. The outer end of the live cylinder lever 80 may be additionally and slidably supported on brackets 102 and 104 fixed to the frame 10.

It is to be understood that I do not wish to be limited by the exact embodiment of the device shown, which is merely by way of illustration and not limitation, as various other forms of the device will of course be apparent to those skilled in the art without departing from the spirit of the invention as ascertained from the scope of the appended claims.

I claim:

1. In a brake rigging of the beam type, the combination of a truck frame, spaced supporting wheels for said frame, said wheels having axles, live truck levers on one side of each axle, dead truck levers on the other side of each axle, brake beams connected to said levers, a pull rod connecting the live and dead levers associated with each wheel, live and dead cylinder levers in pivotal engagement with said live truck levers respectively, means on the truck frame intermediate the cylinder levers for actuating the cylinder levers and means for automatically adjusting one of said cylinder levers.

2. In a brake rigging of the beam type, the combination of a truck frame, spaced supporting wheels for said frame, said wheels having axles, live truck levers on one side of each axle, dead truck levers on the other side of each axle, brake beams connected to said levers, a pull rod connecting the live and dead levers associated with each wheel, live and dead cylinder levers in pivotal engagement with said live truck levers respectively, means on the truck frame intermediate the cylinder levers for actuating the cylinder levers, and a pull rod pivotally and adjustably connecting said live and dead cylinder levers.

3. In a brake rigging of the beam type, the combination of a truck frame, spaced supporting wheels for said frame, said wheels having axles, live truck levers on one side of each axle, dead truck levers on the other side of each axle, brake beams connected to said levers, a pull rod connecting the live and dead levers associated with each wheel, live and dead cylinder levers in pivotal engagement with said live truck levers respectively, actuating means on the truck frame intermediate said cylinder levers, said live cylinder lever being pivotally connected to one end of said actuating means and said dead cylinder lever being pivotally connected to the other end of said actuating means.

4. In a brake rigging of the beam type, the combination of a truck frame, spaced supporting wheels for said frame, said wheels having axles, live truck levers on one side of each axle, dead truck levers on the other side of each axle, brake beams connected to said levers, a pull rod connecting the live and dead levers associated with each wheel, live and dead cylinder levers in pivotal engagement with said live truck levers respectively, actuating means on the truck frame intermediate said cylinder levers, and said cylinder levers being pivotally connected to opposite ends of said actuating means.

5. In a brake rigging of the beam type, the combination of a truck frame, spaced supporting wheels for said frame, said wheels having axles, live truck levers on one side of each axle, dead truck levers on the other side of each axle, brake beams connected to said levers, a pull rod connecting the live and dead levers associated with each wheel, live and dead cylinder levers in pivotal engagement with said live truck levers respectively, actuating means on the truck frame intermediate said cylinder levers, said cylinder levers being pivotally connected to opposite ends of said actuating means, and a pull rod pivotally and adjustably connecting said cylinder levers at points intermediate their ends.

6. In a brake rigging of the beam type, the combination of a truck frame, spaced supporting wheels for said frame, said wheels having axles, live truck levers on one side of each axle, dead truck levers on the other side of each axle, brake beams connected to said levers, a pull rod connecting the live and dead levers associated with each wheel, live and dead cylinder levers in pivotal engagement with said live truck levers respectively, actuating means on the truck frame intermediate said cylinder levers, said live cylinder lever being pivotally connected to one end of said actuating means and said dead cylinder lever being pivotally connected to the other end of said actuating means through automatically adjustable means.

7. In a brake rigging, the combination with a truck frame, wheels supporting said frame, truck levers arranged in pairs at each wheel, one of each of said pairs being a dead lever, a brake beam connecting certain of said truck levers, other levers having pivotal engagement with certain of said truck levers, a bar connecting the last mentioned levers intermediate the ends thereof, one of said last mentioned levers being a dead lever, and actuating means secured to the other of said last mentioned levers and disposed between said last named levers.

8. In a brake rigging, the combination with a truck frame, wheels associated therewith, brake beams on each side of said wheels, a plurality of truck levers associated with said brake beams, said truck levers including dead levers disposed adjacent each wheel, a plurality of other levers having pivotal engagement with the truck levers, a bar connecting said other levers intermediate the ends thereof, and means actuating one of said other levers, said means being secured to said truck frame.

9. In a brake rigging, the combination with a truck frame, wheels associated therewith, brake beams on each side of said wheels, a plurality of truck levers associated with said brake beams and inwardly thereof, said truck levers including dead levers disposed adjacent each wheel, a plurality of other levers having pivotal engagement with the truck levers, a bar connecting said other levers intermediate the ends thereof, and means actuating one of said other levers, said means being secured to said truck frame.

10. In a brake rigging, the combination with a truck frame, wheels associated therewith, a plurality of truck levers pivotally secured to said frame, a pull rod connecting pairs of levers associated with each wheel, a guide for one end of said pull rod disposed on said frame, a plurality of other levers having pivotal engagement with the truck levers, means on said truck frame for adjustably securing one of said other levers thereto, a bar for connecting said other levers intermediate the ends thereof, and means secured substantially intermediate the truck frame for actuating said other levers.

11. In a truck, the combination of a truck frame, spaced wheels cooperating therewith, said wheels having axles, dead levers pivoted to said truck at each end thereof adjacent and inwardly of each of said wheels, live levers disposed adjacent said wheels on the opposite sides of the axles of said wheels from said dead levers, brake shoes provided for said dead and live levers and adapted to have braking cooperation with said wheels, pull rods connecting adjacent pairs of dead and live levers above the wheel centers, a dead lever pivoted adjacent one of said live levers and connected thereto, a live lever, means for operating said last named live lever including a brake cylinder mounted on said frame, the piston of said cylinder being connected to said last named live lever, said last named live lever being connected to said last named dead lever and said other live lever.

12. In a four-wheel truck, the combination of a truck frame, spaced wheels cooperating therewith, said wheels having axles, dead levers pivoted to said truck at each end thereof adjacent said wheels, live levers disposed adjacent said wheels on the opposite sides of the axles of said wheels from said dead levers, brake shoes provided for said dead and live levers and adapted to have braking cooperation with said wheels, pull rods connecting adjacent pairs of dead and live levers above the wheel centers and slidably guided on said frame, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

13. In a four-wheel truck, the combination of a truck frame, spaced wheels cooperating therewith, said wheels having axles, dead levers pivoted to said truck at each end thereof adjacent said wheels, live levers disposed adjacent said wheels on the opposite sides of the axles of said wheels from said dead levers, brake shoes provided for said dead and live levers and adapted to have braking cooperation with said wheels, pull rods connecting adjacent pairs of dead and live levers above the wheel centers and slidably guided on said frame, a brake cylinder mounted on said frame between said wheels, a dead lever pivoted intermediate said wheels to said brake cylinder adjacent one of said live levers and connected thereto, a live lever operatively connected to said cylinder, said last named live lever being connected to said last named dead lever and said other live lever.

14. In a truck, the combination of a truck frame, spaced wheels cooperating therewith, said wheels having axles, brake beams on each side of each wheel, dead levers pivoted to said truck at each end thereof adjacent each of said wheels, live levers disposed adjacent said wheels on the opposite sides of the axles of said wheels from said dead levers, said levers cooperating with said brake beams, brake shoes carried by said brake beams and adapted to have braking cooperation with said wheels, pull rods connecting adjacent pairs of dead and live levers, a dead lever pivoted to said truck frame adjacent one of said live levers and connected thereto, a live lever, means for operating said last named live lever including a brake cylinder mounted on said frame, the piston of said cylinder being connected to the end of said last named live lever, said last named live lever being connected to said last named dead lever and said other live lever.

15. In a truck, the combination of a truck frame, spaced wheels cooperating therewith, said wheels having axles, dead levers pivoted to said truck at each end thereof adjacent each of said wheels, live levers disposed adjacent said wheels on the opposite sides of the axles of said wheels from said dead levers, said levers being inwardly of the plane of said wheels, brake shoes provided for said dead and live levers and adapted to have braking cooperation with said wheels, pull rods connecting adjacent pairs of dead and live levers, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

16. In a truck, the combination of a truck frame, spaced wheels cooperating therewith, said wheels having axles, dead levers pivoted to said truck at each end thereof adjacent said wheels, live levers disposed adjacent said wheels on the opposite sides of the axles from said dead levers, brake shoes provided for said dead and live levers and adapted to have braking cooperation with said wheels, pull rods connecting adjacent pairs of dead and live levers, said pull rods having an inner extension slidably guided on said frame, a brake cylinder mounted on said frame between said wheels, a dead lever pivoted intermediate said wheels to said brake cylinder adjacent one of said live levers and connected thereto, a live lever operatively connected to said cylinder, said last named live lever being connected to said last named dead lever and said other live lever.

17. In a truck, the combination of a truck frame, spaced wheels cooperating therewith, said wheels having axles, dead levers pivoted to said truck adjacent said wheels, live levers disposed adjacent said wheels on the opposite sides of the axles from said dead levers, brake shoes carried by said dead and live levers and adapted to have braking cooperation with said wheels, pull rods connecting adjacent pairs of dead and live levers above the wheel centers, said pull rods having an inner extension slidably guided on said frame, a dead lever pivoted to said truck frame adjacent one of said live levers and connected thereto, a live lever, means for operating said last named live lever including a brake cylinder mounted on said frame, the piston of said cylinder being connected to said last named live lever, said last named live lever being connected to said last named dead lever and said other live lever.

18. In a truck, the combination of a truck frame, spaced wheels cooperating therewith, said wheels having axles, dead levers pivoted to said truck at each end thereof adjacent said wheels, live levers disposed adjacent said wheels on the opposite sides of the axles from said dead levers, brake shoes provided for said dead and live levers and adapted to have braking cooperation with said wheels, pull rods connecting adjacent pairs of dead and live levers above the wheel centers, said pull rods having an inner extension slidably supported on said frame, a brake cylinder mounted on said frame, a dead lever pivoted to said brake cylinder adjacent one of said live levers and connected thereto, a live lever operatively connected to said cylinder, said last named live lever being connected to said last named dead lever and said other live lever.

19. In a truck, the combination of a truck frame, spaced wheels cooperating therewith, said wheels having axles, dead levers pivoted to said truck at each end thereof adjacent and inwardly of each of said wheels, live levers disposed adjacent said wheels on the opposite sides of the axles of said wheels from said dead levers, brake shoes provided for said dead and live levers and adapted to have braking cooperation with said wheels, pull rods connecting adjacent pairs of dead and live levers above the wheel centers, a dead lever pivoted adjacent one of said live levers and connected thereto, a live lever, means for operating said last named live lever including a brake cylinder secured to said truck frame between said last named dead and live levers, the piston of said cylinder being connected to said last named live lever, said last named dead lever being pivoted to said cylinder, said last named live lever being connected to said last named dead lever and said other live lever.

20. In a truck, the combination of a truck frame, spaced wheels cooperating therewith, said wheels having axles, brake beams on each side of each wheel, dead levers pivoted to said truck at each end thereof adjacent each of said wheels, live levers disposed adjacent said wheels on the opposite sides of the axles of said wheels from said dead levers, said levers cooperating with said brake beams, brake shoes carried by said brake beams and adapted to have braking cooperation with said wheels, pull rods connecting adjacent pairs of dead and live levers, a dead lever adjacent one of said live levers and connected thereto, a live lever, means for operating said last named live lever including a brake cylinder secured to said truck frame between said last named dead and live levers, the piston of said cylinder being connected to said last named live lever, said last named dead lever being pivoted to said cylinder, said last named live lever being connected to said last named dead lever and said other live lever.

21. In a brake rigging, the combination of a truck frame, wheels supporting said truck frame, said wheels having axles, live truck levers on one side of each axle, dead truck levers on the other side of each axle, said truck levers being disposed inboard of said wheels, pull rods connecting pairs of live and dead truck levers, and operating cylinder means mounted on said frame and connected to pairs of said live truck levers for controlling said rigging.

22. In a truck, the combination of a truck frame having a side frame, spaced wheels in supporting relation to said truck frame, said wheels having axles, brake rigging associated with said wheels, said brake rigging including live and dead truck levers on opposite sides of each axle, brake beams connecting truck levers at opposite sides of the truck, and operating means for said brake rigging, said operating means including a brake cylinder at each side of the truck supported by said side frame, substantially horizontal cylinder levers operatively connected to each other and to the adjacent brake cylinder, one of said last named levers being a live lever, said levers being connected to said brake rigging.

23. In a truck, the combination of a truck frame having a side frame, spaced wheels in supporting relation to said truck frame, said wheels having axles, brake rigging associated with said wheels, said brake rigging including live and dead truck levers on opposite sides of each axle, brake beams connecting truck levers at opposite sides of the truck, and operating means for said brake rigging, said operating means including a brake cylinder at each side of the truck supported by said side frame between adjacent wheels, substantially horizontal cylinder levers operatively connected to each other and to the adjacent brake cylinder, said levers being connected to said brake rigging.

24. In a truck, the combination of a truck frame having a side frame, spaced wheels in supporting relation to said truck frame, said wheels having axles, brake rigging associated with said wheels, said brake rigging including live and dead truck levers on opposite sides of each axle, brake beams connecting truck levers at opposite sides of the truck, and operating means for said brake rigging, said operating means including a brake cylinder at each side of the truck supported by said side frame, cylinder levers operatively connected to each other intermediate the ends thereof and to the adjacent brake cylinder adjacent their ends, one of said levers being a live lever, said levers being connected to said brake rigging.

25. In a truck, the combination of a truck frame having a side frame, spaced wheels in supporting relation to said truck frame, said wheels having axles, brake rigging associated with said wheels, said brake rigging including live and dead truck levers on opposite sides of each axle, brake beams connecting truck levers at opposite sides of the truck, and operating means for said brake rigging, said operating means including a brake cylinder at each side of the truck supported by said side frame between adjacent wheels, substantially horizontal cylinder levers operatively connected to each other intermediate the ends thereof and to the adjacent brake cylinder adjacent their ends, said levers being connected to said brake rigging.

26. In a truck, the combination of a truck frame, spaced wheels cooperating therewith, said wheels having axles, dead levers pivoted to said truck at each end thereof adjacent each of said wheels and inwardly of the plane thereof, live levers disposed adjacent said wheels on the opposite sides of the axles of said wheels from said dead levers, brake shoes provided for said dead and live levers and adapted to have braking cooperation with said wheels, pull rods connecting adjacent pairs of dead and live levers above the wheel centers, a brake cylinder mounted on said frame between said wheels, a dead lever pivoted to said brake cylinder adjacent one of said live levers and connected thereto, a live lever operatively connected to said cylinder, said last named live lever being connected to said last named dead lever and said other live lever.

27. In a truck, the combination of a truck frame, spaced wheels cooperating therewith, said wheels having axles, dead levers pivoted to said truck at each end thereof adjacent each of said wheels, live levers disposed adjacent said wheels on the opposite sides of the axles of said wheels from said dead levers and inwardly of the plane of said wheels, brake shoes provided for said dead and live levers and adapted to have braking cooperation with said wheels, pull rods connecting adjacent pairs of dead and live levers above the wheel centers, a brake cylinder mounted on said frame between said wheels, a dead lever pivoted intermediate said wheels to said brake cylinder adjacent one of said live levers and connected thereto, a live lever operatively connected to said cylinder, said last named live lever being connected to said last named dead lever and said other live lever.

28. In a truck, the combination of a truck frame, spaced wheels cooperating therewith, said wheels having axles, dead levers pivoted to said truck at each end thereof adjacent each of said wheels, live levers disposed adjacent said wheels on the opposite sides of the axles of said wheels from said dead levers, said levers being disposed inwardly of the planes of said wheels, brake shoes provided for said dead and live levers and adapted to have braking cooperation with said wheels, pull rods connecting adjacent pairs of dead and live levers, a brake cylinder mounted on said frame between said wheels, a dead lever pivoted intermediate said wheels to said brake cylinder adjacent one of said live levers and connected thereto, a live lever operatively connected to said cylinder, said last named live lever being connected to said last named dead lever and said other live lever.

29. In a truck, the combination of a truck frame, spaced wheels cooperating therewith, said wheels having axles, dead levers pivoted to said truck at each end thereof adjacent each of said wheels, live levers disposed adjacent said wheels on the opposite sides of the axles of said wheels from said dead levers, said levers being disposed inwardly of the planes of said wheels, brake shoes provided for said dead and live levers and adapted to have braking cooperation with said wheels, pull rods connecting adjacent pairs of dead and live levers above the wheel centers, a brake cylinder mounted on said frame, a dead lever pivoted to said brake cylinder adjacent one of said live levers and connected thereto, a live lever operatively connected to said cylinder, said last named live lever being connected to said last named dead lever and said other live lever.

30. In a truck, the combination of a truck frame having a side frame, spaced wheels in supporting relation to said truck frame, said wheels having axles, brake rigging associated with said wheels, said brake rigging including live and dead truck levers on opposite sides of each axle, connecting means connecting the truck levers at opposite sides of the truck, and operating means for said brake rigging, said operating means including a brake cylinder at each side of the truck supported by said side frame, substantially horizontal cylinder levers operatively connected to each other and to the adjacent brake cylinder, one of said levers being a live liver, said levers being connected to said brake rigging.

31. In a truck, the combination of a truck frame having a side frame, spaced wheels in supporting relation to said truck frame, said wheels having axles, brake rigging associated with said wheels, said brake rigging including live and dead truck levers on each side of each axle, connecting means connecting the truck levers at opposite sides of the truck, and operating means for said brake rigging, said operating means including a brake cylinder at each side of the truck supported by said side frame between adjacent wheels, substantially horizontal cylinder levers operatively connected to each other and to the adjacent brake cylinder, said levers being connected to said brake rigging.

32. In a truck, the combination of a truck frame having a side frame, spaced wheels in supporting relation to said truck frame, said wheels having axles, brake rigging associated with said wheels, said brake rigging including live and dead truck levers on each side of each axle, connecting means connecting the truck levers at opposite sides of the truck, and operating means for said brake rigging, said operating means including a brake cylinder at each side of the truck supported by said side frame, cylinder levers operatively connected to each other intermediate the ends thereof and to the adjacent brake cylinder adjacent their ends, one of said levers being a live lever, said levers being connected to said brake rigging.

33. In a truck, the connection of a truck frame having a side frame, spaced wheels in supporting relation to said truck frame, brake rigging associated with said wheels, said brake rigging including live and dead truck levers on each side of each axle, connecting means connecting the truck levers at opposite sides of the truck, and operating means for said brake rigging, said operating means including a brake cylinder at each side of the truck supported by said side frame between adjacent wheels, substantially horizontal cylinder levers operatively connected to each other intermediate the ends thereof and to the adjacent brake cylinder adjacent their ends, said levers being connected to said brake rigging.

WALTER H. BASELT.

CERTIFICATE OF CORRECTION.

Patent No. 2,077,662.             April 20, 1937.

WALTER H. BASELT.

It is hereby certified that error appears in the printed specification of the above numbered patent requiring correction as follows: Page 5, second column, line 26, claim 33, for "connection" read combination; and line 28, before "brake" insert the words and, comma said wheels having axles,; and that the said Letters Patent should be read with these corrections therein that the same may conform to the record of the case in the Patent Office.

Signed and sealed this 6th day of July, A. D. 1937.

Henry Van Arsdale (Seal)                         Acting Commissioner of Patents.

connected to said last named dead lever and said other live lever.

29. In a truck, the combination of a truck frame, spaced wheels cooperating therewith, said wheels having axles, dead levers pivoted to said truck at each end thereof adjacent each of said wheels, live levers disposed adjacent said wheels on the opposite sides of the axles of said wheels from said dead levers, said levers being disposed inwardly of the planes of said wheels, brake shoes provided for said dead and live levers and adapted to have braking cooperation with said wheels, pull rods connecting adjacent pairs of dead and live levers above the wheel centers, a brake cylinder mounted on said frame, a dead lever pivoted to said brake cylinder adjacent one of said live levers and connected thereto, a live lever operatively connected to said cylinder, said last named live lever being connected to said last named dead lever and said other live lever.

30. In a truck, the combination of a truck frame having a side frame, spaced wheels in supporting relation to said truck frame, said wheels having axles, brake rigging associated with said wheels, said brake rigging including live and dead truck levers on opposite sides of each axle, connecting means connecting the truck levers at opposite sides of the truck, and operating means for said brake rigging, said operating means including a brake cylinder at each side of the truck supported by said side frame, substantially horizontal cylinder levers operatively connected to each other and to the adjacent brake cylinder, one of said levers being a live liver, said levers being connected to said brake rigging.

31. In a truck, the combination of a truck frame having a side frame, spaced wheels in supporting relation to said truck frame, said wheels having axles, brake rigging associated with said wheels, said brake rigging including live and dead truck levers on each side of each axle, connecting means connecting the truck levers at opposite sides of the truck, and operating means for said brake rigging, said operating means including a brake cylinder at each side of the truck supported by said side frame between adjacent wheels, substantially horizontal cylinder levers operatively connected to each other and to the adjacent brake cylinder, said levers being connected to said brake rigging.

32. In a truck, the combination of a truck frame having a side frame, spaced wheels in supporting relation to said truck frame, said wheels having axles, brake rigging associated with said wheels, said brake rigging including live and dead truck levers on each side of each axle, connecting means connecting the truck levers at opposite sides of the truck, and operating means for said brake rigging, said operating means including a brake cylinder at each side of the truck supported by said side frame, cylinder levers operatively connected to each other intermediate the ends thereof and to the adjacent brake cylinder adjacent their ends, one of said levers being a live lever, said levers being connected to said brake rigging.

33. In a truck, the connection of a truck frame having a side frame, spaced wheels in supporting relation to said truck frame, brake rigging associated with said wheels, said brake rigging including live and dead truck levers on each side of each axle, connecting means connecting the truck levers at opposite sides of the truck, and operating means for said brake rigging, said operating means including a brake cylinder at each side of the truck supported by said side frame between adjacent wheels, substantially horizontal cylinder levers operatively connected to each other intermediate the ends thereof and to the adjacent brake cylinder adjacent their ends, said levers being connected to said brake rigging.

WALTER H. BASELT.

CERTIFICATE OF CORRECTION.

Patent No. 2,077,662.  April 20, 1937.

WALTER H. BASELT.

It is hereby certified that error appears in the printed specification of the above numbered patent requiring correction as follows: Page 5, second column, line 26, claim 33, for "connection" read combination; and line 28, before "brake" insert the words and, comma said wheels having axles,; and that the said Letters Patent should be read with these corrections therein that the same may conform to the record of the case in the Patent Office.

Signed and sealed this 6th day of July, A. D. 1937.

Henry Van Arsdale (Seal)  Acting Commissioner of Patents.

CERTIFICATE OF CORRECTION.

Patent No. 2,077,662.  April 20, 1937.

WALTER H. BASELT.

It is hereby certified that error appears in the printed specification of the above numbered patent requiring correction as follows: Page 5, second column, line 26, claim 33, for "connection" read combination; and line 28, before "brake" insert the words and, comma said wheels having axles,; and that the said Letters Patent should be read with these corrections therein that the same may conform to the record of the case in the Patent Office.

Signed and sealed this 6th day of July, A. D. 1937.

Henry Van Arsdale (Seal)  Acting Commissioner of Patents.